(12) United States Patent
Yamamoto

(10) Patent No.: US 7,333,242 B2
(45) Date of Patent: Feb. 19, 2008

(54) TEST PRINT PRODUCING METHOD AND PHOTOGRAPH IMAGE PRINTING METHOD USING THE SAME

(75) Inventor: Hiroyasu Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1142 days.

(21) Appl. No.: 09/984,227

(22) Filed: Oct. 29, 2001

(65) Prior Publication Data
US 2003/0081274 A1    May 1, 2003

(30) Foreign Application Priority Data
Oct. 27, 2000    (JP)    ............................. 2000-328728

(51) Int. Cl.
*G06K 15/00*    (2006.01)
*H04N 1/40*    (2006.01)

(52) U.S. Cl. ...................... 358/2.1; 358/3.24; 358/443; 382/167

(58) Field of Classification Search ................. 358/1.9, 358/2.1, 3.24, 443, 302; 382/167
See application file for complete search history.

(56) References Cited

U.S. PATENT DOCUMENTS

| | | | | |
|---|---|---|---|---|
| 5,416,613 A | * | 5/1995 | Rolleston et al. | ............ 358/518 |
| 5,450,165 A | * | 9/1995 | Henderson | .................... 399/49 |
| 5,598,272 A | * | 1/1997 | Fisch et al. | ................... 358/1.9 |
| 5,717,838 A | * | 2/1998 | LeClair | ....................... 358/1.9 |
| 6,043,476 A | * | 3/2000 | Tsai | ........................... 250/205 |

* cited by examiner

*Primary Examiner*—David Moore
*Assistant Examiner*—James A. Thompson
(74) *Attorney, Agent, or Firm*—Sughrue Mion, PLLC.

(57) ABSTRACT

The test print procuding method produces a test print by applying image processing to a digital image data representing a photograph image based on a plurality of image processing conditions including one or more image processing parameters and their ranges, and then recording processed digital image data on a predetermined recording medium. The method sets a predetermined area in the photograph image as an area for the test print, sets the one or more image processing parameters to be changed and their ranges to be changed in the plurality of image processing conditions when producing the test print, applying the image processing under the plurality of image processing conditions in which each value of the set one or more image processing parameters is changed according to the set ranges to the digital image data in the area for the test print to obtain image data for a plurality of test print images; and recording the image data for the plurality of test print images obtained on one or more predetermined recording media in a predetermined layout to produce one or more test print. The photographic image printing method produces a finished photographic print using the test print producing method.

30 Claims, 6 Drawing Sheets

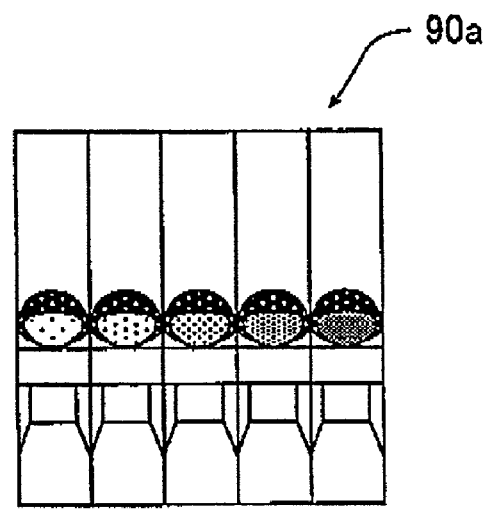
FIG. 6A
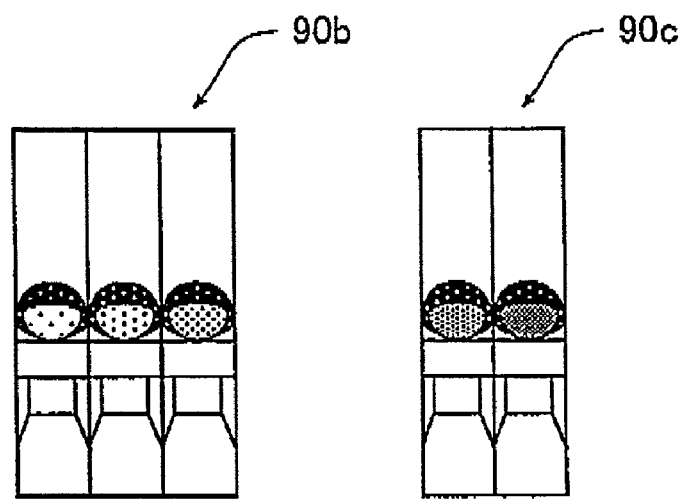
FIG. 6B
FIG. 7
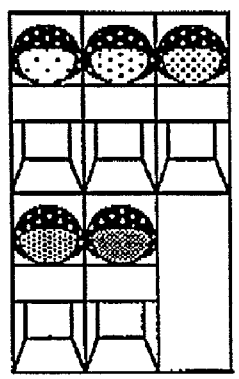

TEST PRINT PRODUCING METHOD AND PHOTOGRAPH IMAGE PRINTING METHOD USING THE SAME

BACKGROUND OF THE INVENTION

1. Field of the Invention

The present invention relates to a method of producing a photograph print by printing a photograph image on a recording medium such as a printing paper and the like, and more specifically, to a method of producing a test print by producing a test print to check color density or the like, producing a round print, and deciding an optimum image processing condition, and to a method of printing photograph image using the method of producing the test print, when producing a high-magnification print or printing a volume of copies.

2. Description of the Related Art

In the conventional method of printing an image being taken to a photographic film such as a negative film, a reversal film and the like on a photosensitive material (a printing paper), mainly, a film image is projected on the photosensitive material, and then the surface of the photosensitive material is exposed, in which direct exposure (analogue exposure) is mainly performed.

Contrary to this conventional method, printing equipment using digital exposure, which is a digital photo printer, is put to practical use in recent years. The digital photo printer has been realized for carrying out photoelectric reading of an image recorded on the film, transforming the read image into a digital signal, carrying out a variety of image processing to produce an image data for recording, carrying out the scanning exposure of the photosensitive material by a recording light modulated corresponding to this image data, recording the image (latent image), and producing a (finished) print. When transforming the image into the digital image data, after carrying out the image processing, the digital photo printer can decide the exposure condition at the time of printing. Further, the digital photo printer can preferably correct a washed-out image or a flat image due to a backlight or an electronic flash taken, carry out sharpness processing, correct a color or a density failure and the like. Therefore, the digital photo printer can produce a high quality print, though the conventional printing equipment using direct exposure could not realize that. Since the digital photo printer can compose a plurality of images, partition an image into plural sections, and compose characters by carrying out the image data processing, it can flexibly output the edited print or processed print depending on the use. Further, the digital photo printer not only can output the image as a print (photograph) but also the image data directly on the recording medium. The printed-out image data can be applied to various purposes besides a photograph. On the other hand, the printer of the analogue exposure system has to record the photograph image on a printing paper to check the color density. Therefore, before producing the print (finished print) for the customer (production print), the printer of the analogue exposure system has to produce another print (test print) to check the color density or the like (test print). In particular, when the printer of the analogue exposure system produces high-magnification print, it reduces the size of the photograph print to thereafter carry out the processing required for making the color density equal. However, the image may be reproduced with a slightly different impression depending on the magnification of the print. Therefore, it is known that a preferable printing method in the printer of the analogue exposure system includes the steps of checking the quality of the image in the actually reproduced size, adjusting the image processing conditions, and printing the image.

This test print for checking such a color density is actually produced as a so-called round print, wherein for saving the consuming amount of the printing paper, the printer of the analogue exposure system includes the steps of cutting only one section respectively from a plurality of images or cutting a plurality of areas from one photo image, and recording the plural cut images on one piece of printing paper.

For example, JP 9-80643 A disclosed an example of the method of producing a round print. According to this document, when exposing the image for the test print to the printing paper, the example includes the steps of putting a mask having a narrow aperture width which is provided along the longitudinal direction of the printing paper on a negative film, transporting the printing paper by the length equal to the aperture width, adjusting gradually the exposure conditions during transporting the paper, printing sequentially the image, and producing the round print as the test print.

When a test print is produced in printing with the digital photo printer. When the printing quality is much important, for example, when producing a high-magnification print or printing a volume of copies, the digital photo printer often produces a test print. Then, the production (finished) print is produced depending on the quality of the test print. The digital photo printer records the image processing conditions of the test print to reproduce the quality of the test print on the production print. The production print is produced by a method of calling this image processing conditions.

However, there is an unfavorable problem for a photo processing shop in that the additional cost is incurred because a large-volume of paper (printing paper) is needed for the test print in printing at a high magnification. To reduce the amount of paper consumed for the test print, the printer reduces the size of the test print. However, though the printer tried to make the color density equal, the image sometimes has slightly different impression or difference in a finished image structure such as sharpness. Therefore, there is another problem in that the printer cannot always carry out the satisfactory check of the final printing quality depending on the magnification of the test print.

Further, when a digital laboratory equipment such as the digital photo printer is used, the digital laboratory equipment can vary various image processing conditions differing from the conventional analogue laboratory equipment. Therefore, when managing the image processing conditions skillfully to provide a best combination for each scene, the digital photo printer can produce a high quality print. However, it is difficult to decide the best combination. Therefore, there is a problem in that an inexperienced operator, in particular, takes much time and a volume of paper for this operation.

SUMMARY OF THE INVENTION

The present invention is devised for solving the above-described conventional problems. An object of the present invention is to provide the method of producing the test print and the method of printing the photograph image by using the method of producing the test print, which can improve the processing performance in producing the print because they can reduce the amount of paper consumed for the test print, and produce the test print allowing the determination of the most appropriate combination of the image processing conditions.

In order to attain the object described above, the first aspect of the present invention provides a method of producing a test print by applying image processing to a digital image data representing a photograph image based on a plurality of image processing conditions including one or more image processing parameters and their ranges, in which each value of the one or more image processing is changed and then recording processed digital image data on a predetermined recording medium, the method comprising the steps of: setting a predetermined area in the photograph image as an area for the test print; setting the one or more image processing parameters to be changed, and their ranges to be changed in the plurality of image processing conditions when producing the test print; applying the image processing under the plurality of image processing conditions in which each value of the set one or more image processing parameters is changed according to the set ranges to the digital image data in the area for the test print to obtain image data for a plurality of test print images; and recording the image data for the plurality of test print images obtained on one or more predetermined recording media in a predetermined layout to produce one or more test print.

Preferably, setting of the ranges in which each value of the one or more image processing parameters is changed, is performed by setting upper and lower limit values of each of the one or more image processing parameters and an amount of a step to be changed between the upper limit value and the lower limit value.

Preferably, setting of the ranges in which each value of the one or more image processing parameters is changed, is performed by setting upper and lower limit values of each of the one or more processing parameter and number of stages between the upper limit value and the lower limit value.

Preferably, setting of the ranges in which each value of the one or more image processing parameters is changed, is performed by setting an amount of a step to be changed and number of stages between their upper and lower limits of each of the one or more image processing parameter, with relative to a center value of each of the one or more image processing parameters.

Preferably, setting of the one or more image processing parameters and the ranges in the image processing conditions, is performed by selecting one of a plurality of sets of combination beforehand set.

Preferably, the area for the test print is each of a plurality of areas in the photographic image.

Preferably, the one or more image processing parameters can be set using a combination of two or more kinds of image processing parameters; the ranges for each of the two or more image processing parameters can be set; the image processing is applied to the area for the test print under the image processing conditions of number equal to or less than the number of possible combination based on the ranges set for each of the two or more image processing parameters to obtain image data for a plurality of test print images; and the obtained image data for the plurality of the test print images is recorded on one or more recording media in the predetermined layout in order to produce one or more test print.

Preferably, the one or more image processing parameters include at least one of density, color balance, sharpness, contrast and gradation.

Preferably, the test print is produced by printing the area for the test print set at magnification equal to magnification of a desired photograph image print.

Preferably, image data for at least one test print image in the plurality of test print images is recorded on one predetermined recording medium in the predetermined layout to produce one test print.

In order to attain the object described above, the second aspect of the present invention provides a method of printing photograph image for producing a photographic print by applying image processing to a digital image data representing the photographic image and recording processed digital image data on a predetermined recording medium, comprising the steps of: producing one or more test print by a test print producing method comprising the steps of: setting a predetermined area in the photograph image as an area for a test print; setting one or more image processing parameters and their ranges in which each value of the one or more image processing parameters is changed in a plurality of image processing conditions under which the image processing is applied, to be changed when producing the test print; applying the image processing under the plurality of image processing conditions in which each value of the set one or more image processing parameters is changed according to the set ranges to the digital image data in the area for the test print in order to obtain a plurality of test print image data; and recording the image data for the plurality of test print images obtained on one or more predetermined recording media in order to produce one or more test prints; storing on a predetermined storage medium the plurality of image processing conditions including the one or more image processing parameters and their ranges used when producing the one or more test prints; reading out from the predetermined storage medium one image processing condition selected from among the stored plurality of image processing conditions based on the produced one or more test prints; applying the image processing to finished print image data for producing a finished photographic print under the one image processing condition read out; and recording the processed digital image data onto the predetermined recording medium to produce the finished photographic print.

Preferably, the digital image data represented by the photographic image is read out using a scanner from a photographic film, and the method of printing comprises the steps of: reading out at least the area for the test print from the photographic film using the scanner; producing the one or more test print using the test print producing method reading out the finished image data using the scanner from an entire image area of a corresponding single frame of the photographic film; and applying the image processing to the finished print image data read out under the one image processing condition selected based on the one or more test print from among the plurality of image processing conditions including the one or more image processing parameters and their ranges used for producing the test print and stored in the predetermined storage medium in order to produce the finished photographic print.

Preferably, the digital image data representing the photograph image is read out using a scanner from a photographic film, and the method of printing further comprises the steps of: reading out the finished print image data from an entire image area of a corresponding single frame of using the scanner from the photographic film; producing the one or more test print using the test print producing method the test print, for image data within the area for the test print in the read out finished print image data; as well as storing the finished print image data, and the plurality of image processing conditions including each of the one or more image processing parameters and their ranges used for producing the test print on the predetermined storage medium; and applying the image processing to the stored finished print image data under the one image processing condition selected based on the one or more test print from among the plurality of image processing conditions including the stored one or more image processing parameters and their ranges in order to produce the finished photographic print.

Preferably, printing magnification of the one or more test print is substantially as same as that of the finished photographic print.

Preferably, an image processing condition for the image processing applied to the finished print image data, is determined by further adjusting the one image processing condition selected from among the plurality of image processing conditions including the stored image processing parameters and their ranges.

Preferably, when producing the test print, symbols for identifying respective image data of the plurality of test print images obtained by applying the image processing to the area for the test print based on the plurality of image processing conditions in which values of the set one or more image processing parameters are changed according to the set ranges, are recorded on a front surface or a back surface of the produced one or more test print, and when producing the finished photographic print, the one image processing condition used for the finished photographic print is selected from among the plurality of image processing conditions including the one or more image processing parameters and their ranges using the symbols.

Preferably, one or more image processing conditions are selected from among the plurality of image processing conditions in which values of the one or more image processing parameters are changed according to the set ranges, and the one or more image processing conditions are registered into the predetermined storage medium.

BRIEF DESCRIPTION OF THE DRAWINGS

In the accompanying drawings:

FIG. 6 is an explanatory view showing an example of the layout of the image for the test print in the present embodiment;

FIG. 7 is also an explanatory view showing another example of the layout of the image for the test print.

DESCRIPTION OF THE PREFERRED EMBODIMENTS

A method of producing a test print and a method of printing a photograph image by using the method of producing the test print will be described hereinafter in detail, which is relating to the present invention with reference to the preferred embodiments shown in the attached drawings.

Figure 1:
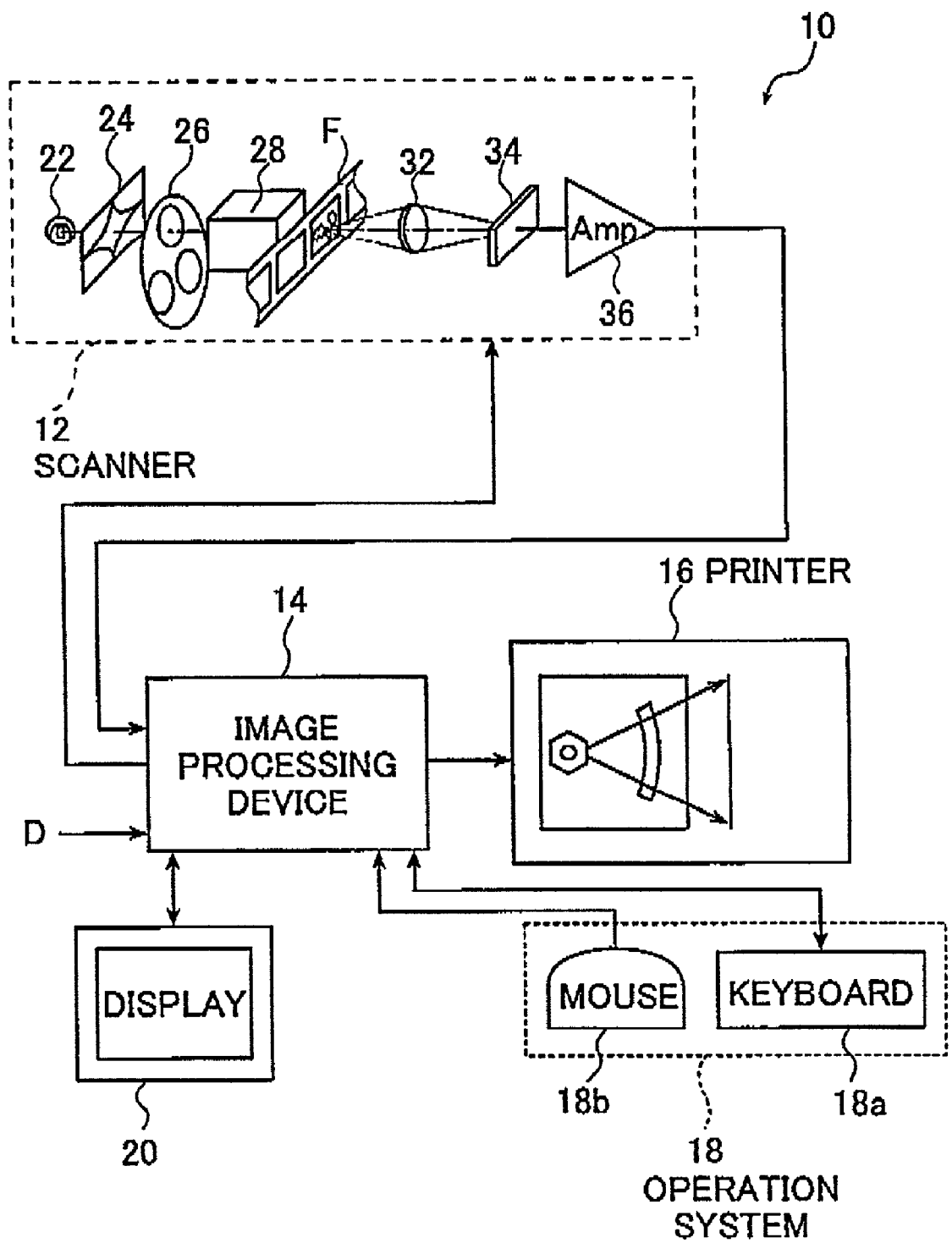
FIG. 1 is a block diagram showing the schematic configuration of providing a digital photo printer for outputting the photo print by carrying out a method of producing a test print, and the method of printing a photograph image by using the method of producing the test print in accordance with the present embodiment.

FIG. 1 is a block diagram showing the schematic configuration of a digital photo printer for printing out the photo print by carrying out the method of producing a test print and the method of printing a photograph image by using the method of producing the test print in accordance with the present embodiment.

FIG. 1 shows that a digital photo printer 10 (hereinafter, referred to simply as "photo printer") is mainly composed of a scanner 12 (image reading equipment) for carrying out photoelectric reading of the image taken on a film F, an image processing equipment 14 for carrying out the image processing of the read image data (image information) or carrying out the total operation or the total control of the photo printer 10 and the like, and a printer 16 for exposing the image to a photosensitive material (printing paper) by a light beam modulated corresponding to the image data output from the image processing equipment 14, then carrying out the development processing to output the finished print. The image processing equipment 14 is connected with an operating system 18 including a keyboard 18a for carrying out an input (setup) of various states, selection of processing, instructions such as a correction of color/density or the like and a mouse 18b, and a display 20 for displaying the image read by the scanner 12, various operation instructions, various condition setup, various registered images and the like. The image processing equipment 14 can further record a digital image data D which is, for example, the data taken by the digital camera and the like, as well as image data read from a film by the scanner 12.

The scanner 12 is equipment for carrying out photoelectric reading of each frame of the image taken on the film F and the like. The scanner 12 includes a light source 22, a variable diaphragm 24, a color filter sheet 26 having three color filters of R (red), G (green), and B (blue) to decompose the image into three primary colors of R, G, and B, and making any color filter act on a light path by its rotation; a diffused box 28 for making an incident reading light to the film F uniform in the direction of the surface of the film F; an image forming lens unit 32; a CCD sensor 34 (here, area sensor) to be an image reading sensor for reading each frame of the image on the film; and an AMP (amplifier) 36.

Likewise, the photo printer 10 of the example shown in FIG. 1 is provided with a dedicated carrier allowing a film detachable to the main body of the scanner 12, in accordance with a type or size of films such as a negative film of 240 size of APS or a negative film of 135 size (or a reversal film), a form of the film F such as strip or slide and the like and a kind of processing such as trimming. Therefore, when exchanging any carrier, the photo printer 10 can be applied to various kinds of films or processing. The photo printer 10 takes the image on the film F, and the image (frame) supplied for producing the print is transported to a predetermined reading position, and retained by this carrier.

Figure 2:
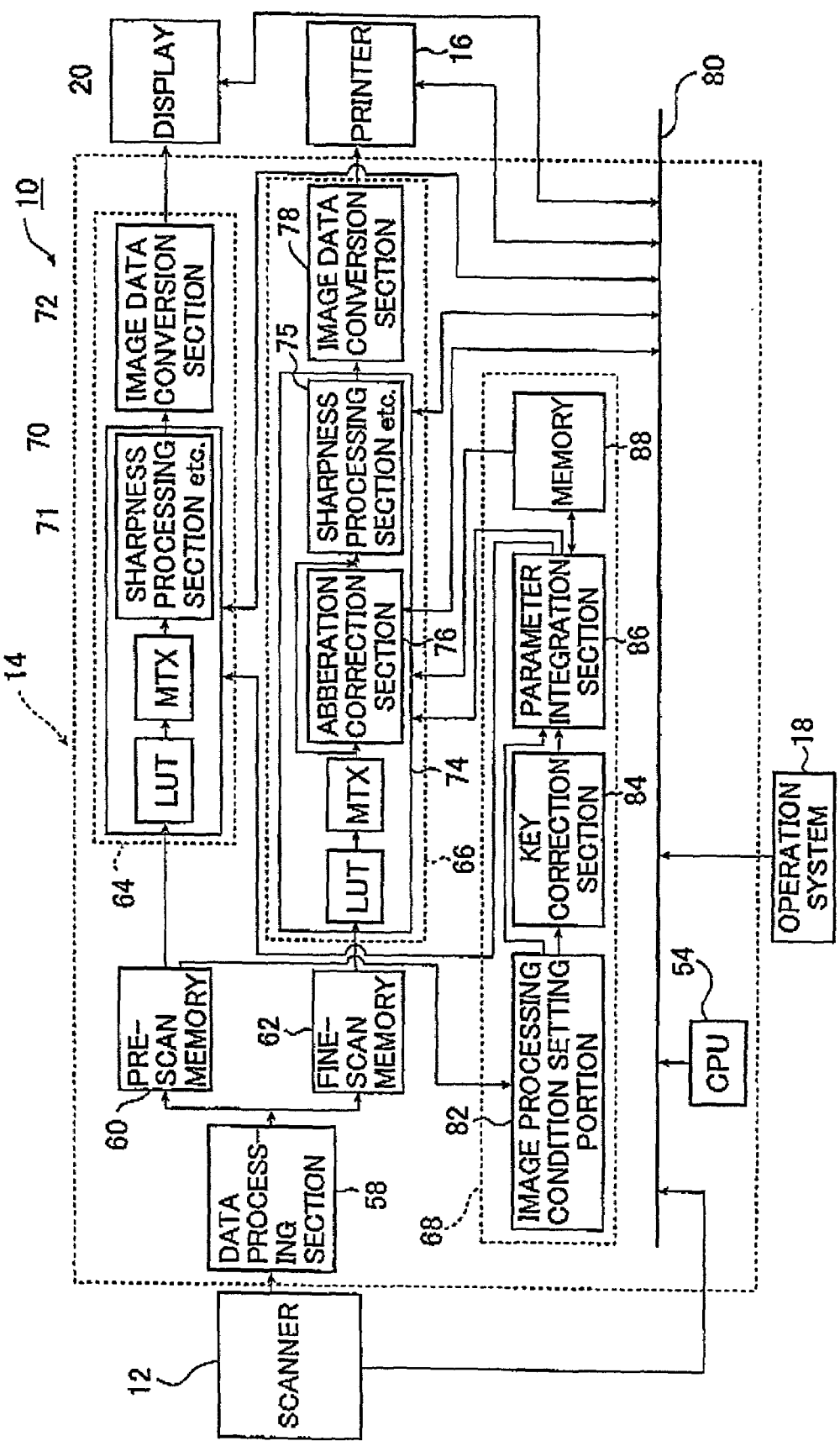
FIG. 2 is a block diagram showing the schematic configuration of image processing equipment shown in FIG. 1.

The scanner 12 outputs an output signal (image data) on the image processing equipment 14. FIG. 2 is a block diagram showing the image processing equipment 14. The image processing equipment 14 is provided with a CPU 54 for carrying out or controlling various image processing, carrying out control of the entire photo printer 10.

Also, the image processing equipment 14 includes a data processing section 58, a pre-scan memory 60, a fine-scan memory 62, a pre-scan image processing section 64, a fine-scan image processing section 66; and a condition setup section 68. Further, a unit which determines a value of diaphragm of the variable diaphragm 24 or a storage time of the CCD sensor 34 in carrying out fine-scan, is disposed on the image processing equipment 14, except for these sections described above. The operating system 18 and the display 20 are connected with respective ones of plural sections via a CPU bus 80 by the CPU 54.

Incidentally, in an image processing system, the A/D processing section 58 processes respective output signals R, G, and B output by the scanner 12, transforms the signal into the digital image data. A pre-scan data is recorded in the pre-scan memory 60. A fine-scan data is recorded in the fine-scan memory 62. There is difference only in the resolution (pixel density) and the signal level between the pre-scan data and the fine-scan data. Except for the resolution (pixel density) and the signal level, the data are basically the same. The pre-scan image processing section 64 processes the pre-scan data recorded in the pre-scan memory 60. The fine-scan image processing section 66 processes the fine-scan data recorded in the fine-scan memory 62. The pre-scan image processing section 64 is composed of an image processing unit 70 and an image data transforming section 72. On the other hand, the image processing unit 70 (hereinafter, referred to as "processing section 70") and an image processing unit 74 (hereinafter, referred to as "processing section 74") of the fine-scan image processing section 66 both carry out a predetermined image processing on the image (image data) read by the scanner 12, in accordance with the image processing conditions determined by a condition setup section 68 described below. Both the processing section 70 and the processing section 74 basically carries out the same processing, except for the difference in the pixel density of the processing image data between the processing section 70 and the processing section 74. The processing section 70 and the processing section 74 generally carry out such image processing as color balance adjustment, contrast correction gradation processing, brightness correction, dodging processing (compression/extension of density dynamic range), saturation correction; and sharpness (brightness/acuity) processing. In addition to these processing, at least one of the processing for correcting lateral chromatic aberration, distortion aberration, marginal luminous energy, blurredness and the like, is exemplified.

These processing are carried out by a well-known method which appropriately combines operation, processing by an LUT (look up table), a matrix (MTX) operation, filter processing and the like. In the example shown in FIG. 2, the color balance adjustment, the brightness correction, and the contrast correction are carried out by the LUT, and the saturation correction is carried out by the MTX (matrix). Also, operations at a block 71 and a block 75 carry out the sharpness processing, the dodging processing and the like except the above-described processing in accordance with an instruction of an operator or the image data and the like.

Here, an aberration correction section 76 is disposed between the MTX of the processing section 74 for processing the fine-scan data and the block 75. The aberration correction section 76 carries out at least one correction of the magnification chromatic aberration or the distortion aberration, and carries out electronic variable processing. The electronic variable processing enlarges or reduces the image by the image data processing. The electronic variable processing prints out the image data corresponding to the size required for the output image. The electronic variable processing is usually carried out by interpolating the image data. Since the method of carrying out the electronic variable processing does not have particularly designated limitation, the aberration correction section 76 can employ various well-known methods, for example, a method of using a bi-linear interpolation, a method of using a spline interpolation and the like.

The image data processed at the processing sections 70 and 74 is transferred to the image data transforming sections 72 and 78. The image data transforming section 72 of the pre-scan image processing section 64 transforms the image data processed by the processing section 70 into the image data corresponding to the image on the display 20 by use of three-dimensional LUT or the like. On the other hand, the image data transforming section 78 of the fine-scan image processing section 66 transforms the image data processed by the processing section 74 into the output image data corresponding to the image recorded on the printer 16 by use of three-dimensional LUT, then supplies the output image data to the printer 16

The condition setup section 68 sets various conditions processed by the pre-scan image processing section 64 and the fine-scan image processing section 66. This condition setup section 68 is composed of an image processing condition setup section 82; a key compensation section 84, a parameter integrating section 86, and a memory 88 for recording the image processing parameters and the like.

The image processing condition setup section 82 (hereinafter, referred to as "setup section") selects the image processing for carrying out. At the same time, the setup section 82 sets the image processing conditions in the processing sections 70 and 74 with the pre-scan data, and then supplies the parameter integration section 86 with the conditions. More specifically, the setup section 82 makes a density histogram, calculates image-feature-amount such as average density, LATD (large area transmission density), highlight (lowest density), shadow (highest density) and the like, from the pre-scan data. Additionally, the setup section 82 determines the image processing conditions such as creation of LUT for density adjustment, gray balance adjustment, gradation adjustment, brightness correction, and contrast correction, or creation of matrix operation for saturation correction, or the like, in accordance with the instruction given by an operator of the operating system 18 operated as required.

The key compensation section 84 calculates the adjusting amount of the image processing conditions (for example, correction amount of LUT and the like) in accordance with a key for adjusting brightness, color, density contrast, sharpness, gradation saturation and the like having set on the keyboard 18a, or various instructions or the like inputted with a mouse 18b, then supplies the parameter integrating section 86 with the calculated amount. Although the detail is described below, when producing a test print, the key compensation section 84 sets the image processing parameters for a test print and their ranges instructed by the operator via the operating section 18, and then supplies the parameter integrating section 86 with the setting. The parameter integrating section 86 receives the image processing conditions set by the setup section 82. The parameter integrating section 86 further corrects (adjusts) or resets the received image processing conditions in accordance with the adjusting amount calculated by the key compensation section 84, or corresponding to the image processing parameters and their ranges for producing a test print, which are instructed (selected) by the operator. The memory 88 records this image processing conditions, the image processing parameters and their ranges requiring for modification of the image processing conditions for a test print. This information is transferred to the processing section 70 of the pre-scan image processing section 64 and the processing section 74 of the fine-scan image processing section 66 as required, and then used for the image processing. Optionally, it is preferable that the memory 88 stores a combination condition of a predetermined image processing parameter and the changing amount, namely a combination of a plurality of parameters as preset data. Thereby, the preset data such as the image processing parameter and the changing amount of range of the parameter are read out from the memory 88 and specified to be able to be set. It will be explained about working of a digital photo-printer, a method of producing a test print of the present invention, and a method of printing a photographic image using the former method. The operation of the present embodiment will be described below. In the present embodiment, a test print for checking a color density and the like is created before creating a production print to be the finished photo print. This test print is used for determining the image processing conditions in producing the production print. Based on these conditions, the image is processed to produce the production print.

First, Embodiment 1 of the present invention describes the case where the scanner 12 reads the image data for the production print from the film F after carrying out fine-scan twice. In the first fine-scan, the scanner 12 reads the area for the test print to produce the test print. In the second fine-scan, the scanner 12 reads the full photo image of one frame taken on the film F to produce the production print.

The operation of the present embodiment will be described below, with reference to a flowchart shown in FIG. 3. In the left side of the flowchart shown in FIG. 3, steps 100 to 116 designate the procedure of process for producing the test print. In the right side of the flowchart shown in FIG. 3, steps 118 to 132 designate the procedure of process for producing a production print. First, the procedure of process for producing the test print will be described.

At step 100, the scanner 12 carries out a pre-scan of the film F to obtain the pre-scan image (pre-scan data). As described above, the pre-scan memory 60 records the pre-scan data.

At step 102, the condition setup section 68 uses this pre-scan data to calculate the image processing parameters. The processing section 70 of the image processing section 64 sets the image processing conditions.

At step 104, the processing section 70 carries out the image processing on the pre-scan data based on this image processing conditions, and then produces a verification image.

At step 106, the display 20 shows the verification image (verification image display).

Figure 4:
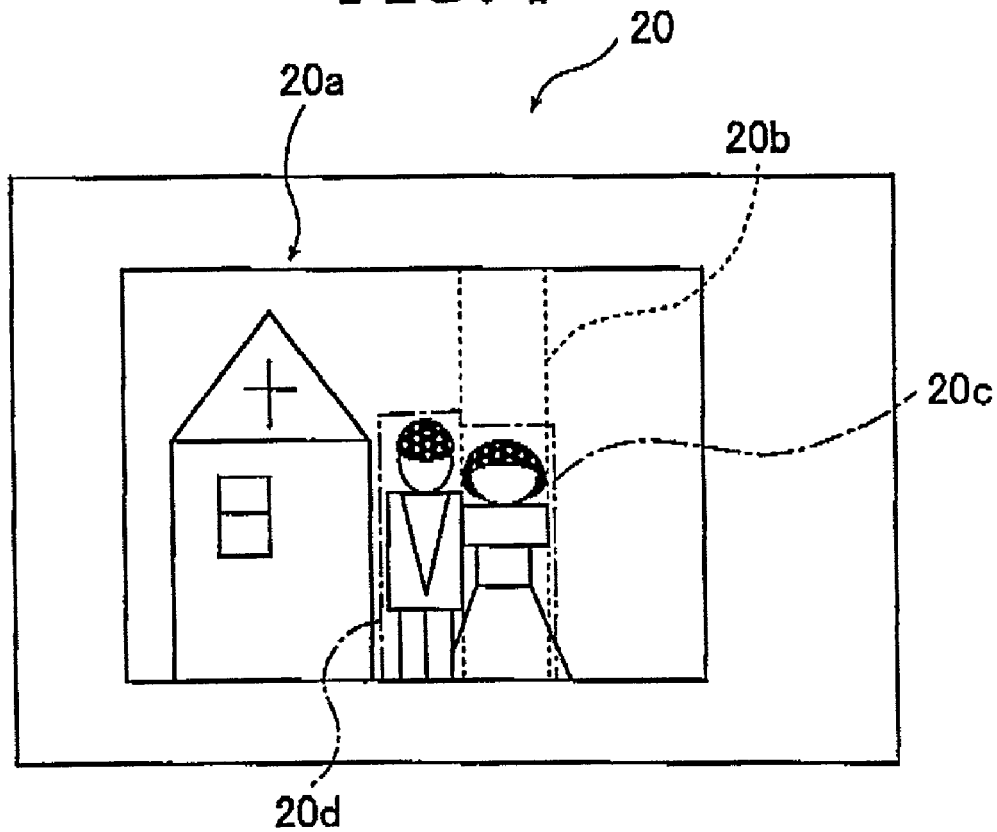
FIG. 4 is an explanatory view showing an example of the photograph image using in the present embodiment.

At step 108, the operator checks this verification image display, and thereafter instructs and sets the test printing area (area of the test print) at first. For example, it is assumed that an image 20*a* taken as a memorial photograph of a wedding ceremony in a church is displayed on a display screen of the display 20, as shown in FIG. 4. The operator designates (sets) the area for the test print within this image. For example, the operator designates a strip area 20*b* enclosed by a dotted line in FIG. 4 so as to only cut out the part of the bride.

In order to designate (set) the area, the operator may use the method of operating the keyboard 18*a*. In this case, the operator moves a cursor on the screen to designate and set the area. The operator may directly designate and set (hereinafter, "designate and set" are merely expressed by at least of "designate" and "set") the area by using the mouse 18*b*. Further, the operator may designate the area by using the other methods except the above-described methods. There is no restriction in cutting-form for setting the area, though the example shown in the FIG. 4 designates the slip area 20*b* by cutting in the longitudinal direction. The operator may designate the area by cutting in the vertical direction, or may designate any rectangle area on the screen Additionally, following modification can be applied to the present invention. A predetermined area being a default setting area may be set as the test print area. Further, the test print area may be set before fine scanning after pre-scanning is completed, or after pre-scanning. Furthermore, when there exist a plurality of areas in a verification display image, i.e. when there exist a plurality of main portions in the image, two or more main portions of the plurality of them may be set as a test print area. For example, when a display image represents a person face, two or more areas directing to the person's eye, nose, mouth and cheek and the like may respectively be set. When a display image represents a plurality of persons, at least of two persons of the plurality of persons may respectively be set. For example, as shown in FIG. 4, the rectangular areas 20*c* and 20*d* surrounded using chain lines for two persons regarded as main portions may be set as a test print area. Such a main portion or main portions may be extracted from a display image using a conventionally known method of extracting a main portion. Further, the extracted area(s) may be regarded as a setting area or setting areas.

After setting the test print area, and then the operator sets the image processing parameters and their ranges at step 110, e.g. which can be set using an upper value and a below value of image processing parameters, and a step amount these values. Namely, concretely explaining, a screen shown in FIG. 5 for inputting the image processing parameters/their ranges is displayed on the display 20, and the operator can set the area with the keyboard 18*a* or the mouse 18*b*. In the example shown in FIG. 5, the density key is designated among respective ones of color keys such as cyan, magenta, and yellow and respective ones of parameter keys such as density, sharpness, and contrast. Also, the ranges are designated as the range from −1 to +1, and the step by 0.5 key step.

The method of inputting the ranges is not restricted to this example. For example, the operator may set the ranges such as at five steps from −1 to +1, or by 0.5 key step with relative to a center value, from −2 to +2. Namely, the image processing parameters and the ranges of the parameter changing may be set using the upper and the lower values, numbers of stages between the upper and the lower values, an amount of a step with relative to the center value, and numbers of stages from the uppermost to the lowest.

Figure 5:
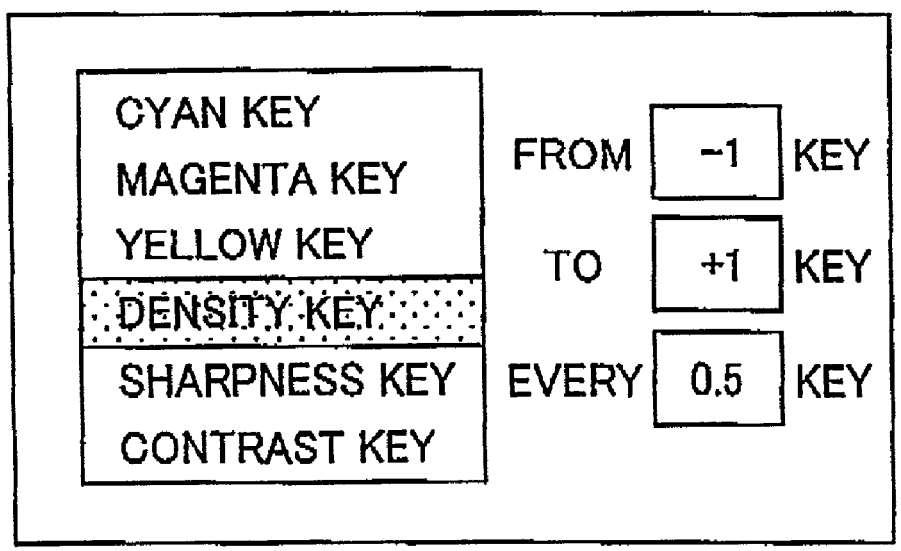
FIG. 5 is an explanatory view showing an example of a display for designating image processing parameters and their ranges in the present embodiment.

The operator may instruct two or more image processing parameters to be changed in the test print, though the example shown in FIG. 5 instructs a single kind of density key. For example, the operator may instruct the ranges such as density key from −1 to +1 by each 0.5 key, further the sharpness key from −1 to +1 by each 1 key. In this case, the operator sets the image processing conditions having five ways in the density key, three ways in the sharpness key. There are totally fifteen ways of combination, as five multiplied by three makes fifteen. Actually, fifteen ways of test print images to be test-printed can be produced.

Further, as the other concrete example, a test print may be produced by combining the sharpness key with a gradation key. The user can confirm optimized image processing conditions for an image to be printed by combining sharpness of the image with hardness/softness of gradation of the image, Next, at step 112, the scanner 12 carries out fine-scan of the test print area designated above from the image of the corresponding frame on the film F in order to actually produce the test print.

At step 114, the processing section 74 of the fine-scan image processing section 66 carries out the image processing on the fine-scan image (fine-scan data) in the test print area obtained by this reading, with resetting the above-designated image processing parameters based on their ranges designated in the same manner. When designating the image processing parameters and their ranges as shown in FIG. 5, five kinds of image in the test print area in the test print area can be obtained, in which respective ones of five images have different density.

The scanner 12 may carry out the above-described fine-scan on only the designated test print area as described above. Also, the scanner 12 may read the whole area of the image (whole area of one frame), and then cut out the designated area to carry out the fine-scan. At step 116, the layout for the image of the test print area (stripe are 20b in FIG. 4) is composed of the five kinds of slips, respective ones of which have different density, then a piece of a test print 90 is output as shown in FIG. 6A. Thus, the slip-formed layout is disposed at the equal magnification to one applied to the production print. As a result, the printing size of the test print 90 is as same as the printing size of the finished print owing to stripe shaped manner. Additionally, in the present invention, as shown in FIG. 6B, a plurality of sheets, e.g. two sheets of test print 90b and 90c may be output. Especially, when increasing the number of image processing parameters or their ranges or the like, the whole test print cannot be contained in one piece of print. In this case, the test print may preferably be printed out as a plurality of pieces of print.

When the set test print area is not the slip-formed area having the equal width to one of the finished print, but the rectangle area as shown in FIG. 4, the layout may be changed to reduce the amount of paper. For example, when a smaller test print area than that set in FIG. 6 is set with respect to the same taking frame as one shown in FIG. 4, arrangement consisting of an upper stage and a lower stage may be used like the test print 90d shown in FIG. 7. Such a layout can reduce the paper amount consumed for the test print.

Of course, by setting such that a single print having a single test print image under a single image processing condition can be produced, a plurality of test prints may also be produced for a plurality of image processing conditions. In this case, each one test print may be produce for each of the plurality of image processing conditions. Alternatively, the single test print may be produced for one of the plurality of image processing conditions and at least one test print may be produced for the reminder of the plurality of image processing conditions. However, in such case of producing the single test print for the single image processing condition, a margin having no image in a paper occurs, depending on the test print area size. Therefore, it is preferable to layout the images such that a paper amount to be used becomes fewer.

Before the production print processing, when the front surface or the back surface of the test print includes, for example, written symbol such as number, alphabet and the like for identifying the image processing parameters and the like corresponding to each image, it is convenient for the operator. Because the operator can easily select the image processing parameters used for the production print processing by checking the test print. When these symbols are written on the front surface of the test print, they may be directly exposed. When these symbols are written on the back surface of the test print, a back-print method and the like is applicable to the exposure of these symbols.

Next, the production print processing will be described. The production print is produced by basically the same way of processing as one in producing the normal (finished) photo print.

Figure 3:
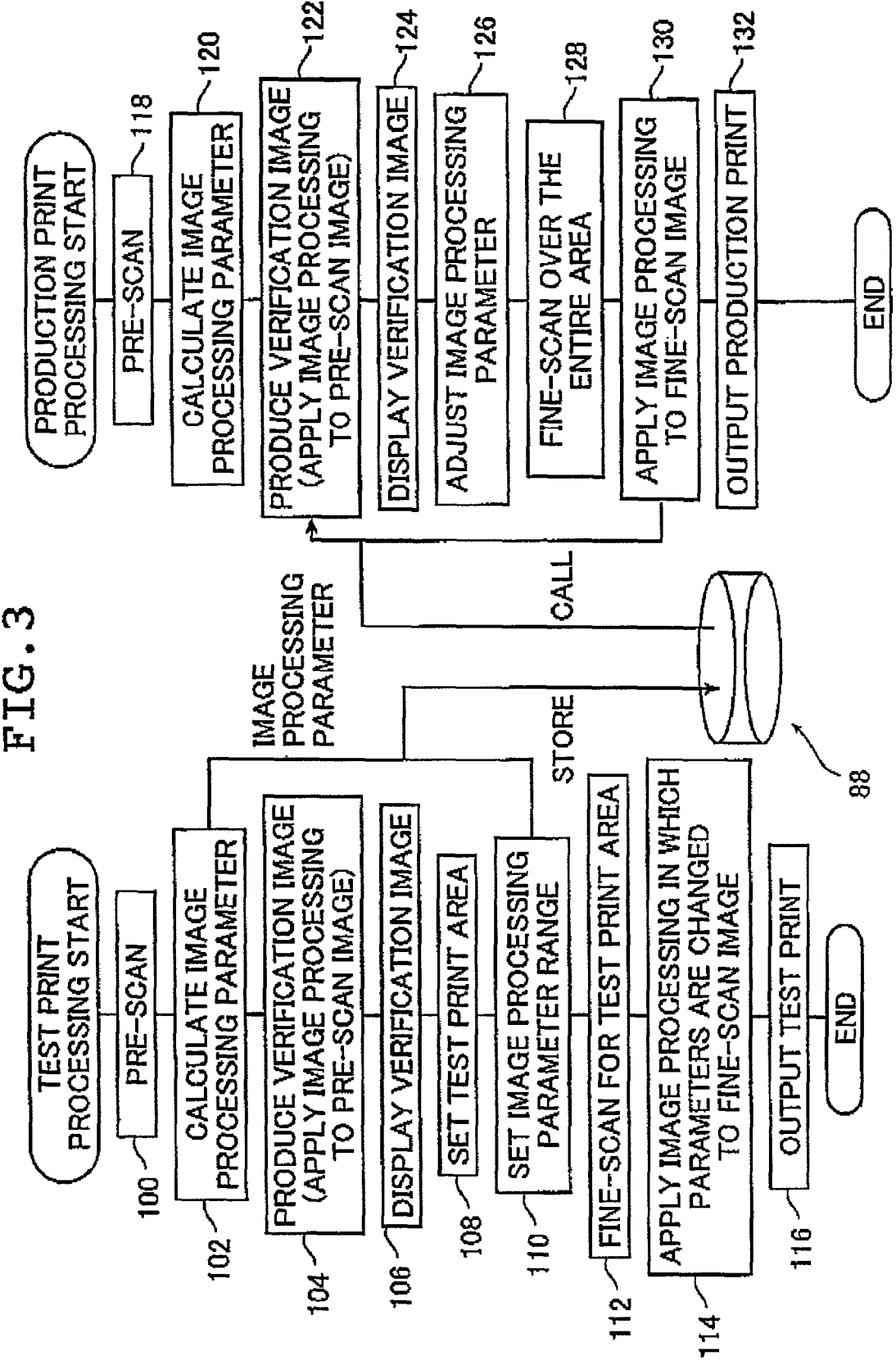
FIG. 3 is a flowchart showing the processing procedure of Embodiment 1 of the present invention.

At step 118 of FIG. 3, the scanner 12 carries out pre-scan of the film F. At step 120, the operator selects the image processing parameters. When selecting the parameters, the operator checks the above-produced test print, selects the most appropriate identification symbols for printing, operates the processing section 18 to input these symbols. As a result, the memory 88 calls the image processing parameters and their ranges corresponding to the identification symbols. The processing section 70 of the pre-scan image processing section 64 and the processing section 74 of the fine-scan image processing section 66 set the identification symbols.

At step 122, the processing section 70 carries out the image processing on the image processing conditions being set with respect to the pre-scan data, and then produces a verification image. At step 124, the display 20 shows the verification image. Next, at step 126, the operator checks this verification image display. Here, the operator may carry out re-adjustment of the image processing parameters selected by the above-produced test print. When the operator determines that there is necessity of re-adjustment of the image processing parameters, the operator transfers the instruction to the parameter integrating section 86 via the operating section 18. The parameter integration section 86 resets the image condition according to the instruction issued by the operator.

Having determined the image processing conditions, at step 128, the scanner 12 carries out fine-scan over the whole area of one frame image corresponding to the film F. At step 130, the processing section 74 carries out the image processing on the fine-scan data (fine-scan image) on the above-set image processing conditions (the image processing conditions determined by the image processing parameters which the operator selects after checking the test print, or the image processing conditions which the operator carries out re-adjustment of the above-described conditions), then the processing section 74 produces the output image data for the production print.

Finally, at step 132, the printer 16 outputs the production print (finished photo print). Next, Embodiment 2 of the present invention will be described. In the present embodiment, the scanner 12 reads the image data for the production print from the film F after carrying out fine-scan once. The scanner 12 records the data to use them for producing the test print and the production print.

Figure 8:
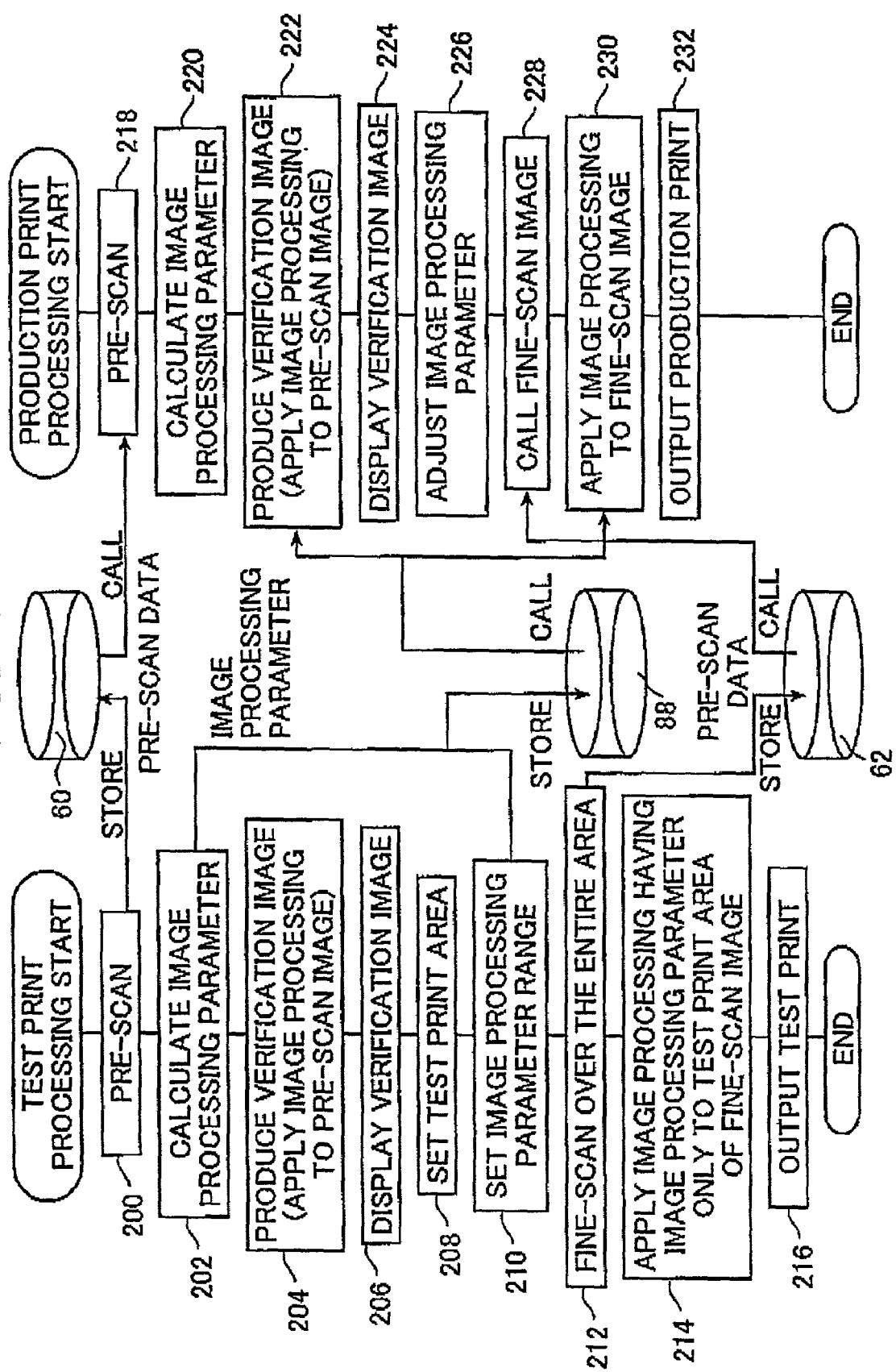
FIG. 8 is a flowchart showing the processing procedure of Embodiment 2 of the present invention.

The second embodiment of the invention will be described below with reference to a flowchart shown in FIG. 8. In the left side of the flowchart shown in FIG. 8, steps 200 to 216 designate the procedure of process for producing the test print, which correspond to steps 100 to 116 of the flowchart shown in FIG. 3. In the right side of the flowchart shown in FIG. 8, steps 218 to 232 designate the procedure of process for producing the production print, which correspond to steps 118 to 132 of the flowchart shown in FIG. 3.

At step 200, the scanner 12 carries out pre-scan of the film F and the pre-scan memory 60 records the pre-scan data. Note that the present embodiment does not carry out pre-scan again in the succeeding production print processing but employs the recorded data. Therefore, it is assumed that the memory is provided with sufficient capacity, or the system may install another memory. Steps 202 to 210 correspond to steps 102 to 110 of the flowchart shown in FIG. 3 of Embodiment 1 above. That is, at step 202, the condition setup section 68 calculates the image processing parameters. At step 204, the processing section 70 carries out the image processing on the pre-scan data based on the calculated image processing parameters, and then produces a verification image. At step 206, the display 20 displays the verification image. At step 208, the operator checks this verification image display, and then designates the test print area. At step 210, the operator instructs the image processing parameters and their ranges, and thereafter the memory 88 stores the image processing parameters and the ranges.

Next, at step 212, the scanner 12 carries out fine-scan over the entire single frame image area. The fine-scan memory 62 stores the fine-scan data. It is assumed that the fine-scan memory 62 is also provided with sufficient capacity, or the system may install another memory. Further, it is assumed that the fine-scan memory stores fine-scan data until the production print is produced later.

Next, at step 214, the processing section 74 of the fine-scan image processing section 66 cuts out the area designated above as the test print area. The processing section 74 of the fine-scan image processing section 66 carries out the image processing on only the cut-out area, by changing in the ranges determined by the above-designated image processing parameters, and then produces the image data for the test print. Finally, at final step 216, the layout of the image data having carried out the image processing is made. For example, the printer 16 outputs the test print as shown in FIG. 6.

Next, the procedure advances to the production print processing. At step 218, the pre-scan data is called from the pre-scan memory 60 (or another memory recording the pre-scan data). Thereafter, at step 220, the image processing parameters is selected. At step 222, the verification image is produced. At step 224, the verification image is displayed. At step 226, the re-adjustment of the image processing parameters is carried out. These steps 220 to 226 correspond to steps 120 to 126 of the flowchart shown in FIG. 3 of Embodiment 1.

At step 228, the fine-scan data is called from the memory recording the fine-scan data (the fine-scan memory 62 or another memory). At step 230, the processing section 74 carries out the image processing on the called fine-scan data on the above-determined image processing condition. At step 232, the printer 16 prints out the production (finished) print. When the memory used for the present embodiment is provided with sufficient capacity, the image processing can be completed by carrying out single scan. Therefore, the present embodiment can extremely efficiently complete the processing.

In both Embodiment 1 and Embodiment 2, the scanner reads out the image of the photographic film, and then inputs the image data. When the digital image data such as, for example, the image taken by a digital camera, is directly input, the digital image data can be used as the above-described pre-scan data by leaving a space, and the digital image data can be used as the image data as it stands for the production print.

As described above, the test print according to the present embodiment includes the steps of designating the target area, determining the image processing parameters on the area, carrying out the image processing on a plurality of image processing conditions, making the layout of the area, and printing out the image. Therefore, the present embodiment can reduce the amount of paper consumed for the test print.

Also, since the present embodiment assigns a plurality of image processing parameters to the printing area at the same time, a plurality of printing images can be compared with each other. Therefore, the present embodiment can efficiently search the most appropriate image processing conditions. This embodiment further produces the test print at the equal printing magnification to one applied to the production print. Therefore, in this embodiment, the finished image structure such as sharpness processing and the like can be easily checked. Further, in this embodiment, there is no difference in the impression of the color density.

Further, since the image processing parameters for the test print is recorded and this recorded image processing parameters can be employed at the time of the production print, the quality of the test print corresponds to that of the production print. Further, the above-described Embodiment 2 applies such a method that the scanner carry out fine-scan of the entire area of the image during test-printing, to record the fine-scan data, to produce the test print. By applying this method to the test print processing, in the case where the production print is carried out, the scanner does not have to carry out fine-scan again. Therefore, the processing performance can be improved. Further, the embodiment has no need for considering variance effected by temperature of fine-scan and the like.

In particular, the present embodiment is advantageous in producing the high magnification print.

The digital photo printer has been explained about the digital photo printer by which a printing paper is image-exposed and developed to obtain a print in the above-mentioned embodiments. Further, each of the embodiments can be applied to a digital photo printer such as an inkjet printer and a sublimate-typed printer.

The method of producing a test print and the method of printing a photograph image using the same are specifically described above. It is to be understood that the present invention is not intended to be limited to the above-described embodiments, and various modifications or changes may be made therein without departing from the spirit of the present invention.

As above-mentioned, when a test print is produced before producing a production print in the digital image processing, the present invention can reduce the amount of paper consumed for the test print, can further produce the test print allowing the determination of the most appropriate image processing conditions, and can still further improve the processing performance in producing the test-print.

What is claimed is:

1. A method of producing a test print by applying image processing to a digital image data representing a photograph image based on a plurality of image processing conditions including one or more image processing parameters and their ranges, in which each value of said one or more image processing is changed, and then recording processed digital image data on a predetermined recording medium, said method comprising the steps of:

setting a predetermined area in said photograph image as an area for said test print;

setting said one or more image processing parameters to be changed and their ranges to be changed in said plurality of image processing conditions when producing said test print;

applying said image processing under said plurality of image processing conditions in which each value of said set one or more image processing parameters is changed according to said set ranges to said digital image data in the area for said test print to obtain image data for a plurality of test print images; and recording said image data for said plurality of test print images obtained on one or more predetermined recording media in a predetermined layout to produce one or more test print.

2. The method of producing the test print according to claim 1, wherein setting of said ranges in which each value of said one or more image processing parameters is changed, is performed by setting upper and lower limit values of each of said one or more image processing parameters and an amount of a step to be changed between said upper limit value and said lower limit value.

3. The method of producing the test print according to claim 1, wherein setting of said ranges in which each value of said one or more image processing parameters is changed, is performed by setting upper and lower limit values of each of said one or more processing parameter and number of stages between said upper limit value and said lower limit value.

4. The method of producing the test print according to claim 1, wherein setting of said ranges in which each value of said one or more image processing parameters is changed, is performed by setting an amount of a step to be changed and number of stages between their upper and lower limits of each of said one or more image processing parameter, with relative to a center value of each of said one or more image processing parameters.

5. The method of producing the test print according to claim 1, wherein setting of said one or more image processing parameters and said ranges in said image processing conditions, is performed by selecting one of a plurality of sets of combination beforehand set.

6. The method of producing the test print according to claim 1, wherein said area for said test print is each of a plurality of areas in said photographic image.

7. The method of producing the test print according to claim 1, wherein said one or more image processing parameters can be set using a combination of two or more kinds of image processing parameters;

said ranges for each of said two or more image processing parameters can be set;

said image processing is applied to said area for said test print under the image processing conditions of number equal to or less than the number of possible combination based on said ranges set for each of said two or more image processing parameters to obtain image data for a plurality of test print images; and the obtained image data for said plurality of the test print images is recorded on one or more recording media in the predetermined layout in order to produce one or more test print.

8. The method of producing the test print according to claim 1, wherein said one or more image processing parameters include at least one of density, color balance, sharpness, contrast and gradation.

9. The method of producing the test print according to claim 1, wherein said test print is produced by printing said area for said test print set at magnification equal to magnification of a desired photograph image print.

10. The method of producing the test print according to claim 1, wherein image data for at least one test print image in said plurality of test print images is recorded on one predetermined recording medium in the predetermined layout to produce one test print.

11. The method according to claim 1, wherein the predetermined area in said photograph image is set as the area for said test print using at least one of a keyboard and a mouse.

12. The method according to claim 1, wherein the predetermined area in said photograph image is set as the area for said test print by selecting item entire image displayed on a display of a computer, the predetermined area.

13. The method according to claim 1, wherein the setting of the predetermined area comprises displaying entire photograph image on a display and selecting by a user on the display, via manipulating user input device, the predetermined area as the area for said test print.

14. A method of printing photograph image for producing a photographic print by applying image processing to a digital image data representing said photographic image and recording processed digital image data on a predetermined recording medium, comprising the steps of:

producing one or more test print by a test print producing method comprising the steps of:

setting a predetermined area in said photograph image as an area for a test print;

setting one or more image processing parameters and their ranges in which each value of said one or more image processing parameters is changed in a plurality of image processing conditions under which said image processing is applied, to be changed when producing said test print;

applying said image processing under said plurality of image processing conditions in which each value of said set one or more image processing parameters is changed according to said set ranges to said digital image data in the area for said test print in order to obtain a plurality of test print image data; and recording said image data for said plurality of test print images obtained on one or more predetermined recording media in order to produce one or more test prints;

storing on a predetermined storage medium said plurality of image processing conditions including said one or more image processing parameters and their ranges used when producing said one or more test prints;

reading out from said predetermined storage medium one image processing condition selected from among the stored plurality of image processing conditions based on said produced one or more test prints;

applying said image processing to finished print image data for producing a finished photographic print under said one image processing condition read out; and recording said processed digital image data onto said predetermined recording medium to produce said finished photographic print.

15. The method of printing the photograph image according to claim 14, wherein said digital image data represented by said photographic image is read out using a scanner from a photographic film, and said method of printing comprises the steps of:

reading out at least said area for said test print from said photographic film using said scanner;

producing said one or more test print using said test print producing method reading out said finished image data using said scanner from an entire image area of a corresponding single frame of said photographic film; and applying said image processing to said finished print image data read out under said one image processing condition selected based on said one or more test print from among said plurality of image processing conditions including said one or more image processing parameters and their ranges used for producing said test print and stored in said predetermined storage medium in order to produce said finished photographic print.

16. The method of printing the photograph image according to claim 14, wherein said digital image data representing said photograph image is read out using a scanner from a photographic film, and said method of printing further comprises the steps of:

reading out said finished print image data from an entire image area of a corresponding single frame of using said scanner from said photographic film;

producing said one or more test print using said test print producing method said test print, for image data within said area for said test print in said read out finished print image data; as well as storing said finished print image data, and said plurality of image processing conditions including each of said one or more image processing parameters and their ranges used for producing said test print on said predetermined storage medium; and applying said image processing to said stored finished print image data under said one image processing condition selected based on said one or more test print from among said plurality of image processing conditions including said stored one or more image processing parameters and their ranges in order to produce said finished photographic print.

17. The method of printing the photograph image according to claim 14, wherein printing magnification of said one or more test print is substantially as same as that of said finished photographic print.

18. The method of printing the photograph image according to claim 14, wherein an image processing condition for said image processing applied to said finished print image data, is determined by further adjusting said one image processing condition selected from among said plurality of image processing conditions including said stored image processing parameters and their ranges.

19. The method of printing the photograph image according to claim 14, wherein, when producing said test print, symbols for identifying respective image data of said plurality of test print images obtained by applying said image processing to said area for said test print based on said plurality of image processing conditions in which values of said set one or more image processing parameters are changed according to said set ranges, are recorded on a front surface or a back surface of said produced one or more test print, and when producing said finished photographic print, said one image processing condition used for said finished photographic print is selected from among said plurality of image processing conditions including said one or more image processing parameters and their ranges using said symbols.

20. The method of printing the photograph image according to claim 14, wherein one or more image processing conditions are selected from among said plurality of image processing conditions in which values of said one or more image processing parameters are changed according to said set ranges, and said one or more image processing conditions are registered into said predetermined storage medium.

21. The method according to claim 14, wherein the predetermined area in said photograph image is set as the area for said test print using at least one of a keyboard and a mouse.

22. The method according to claim 14, wherein the predetermined area in said photograph image is set as the area for said test print by selecting from entire image displayed on a display of a computer, the predetermined area.

23. The method according to claim 14, wherein the setting of the predetermined area comprises displaying entire photograph image on a display and selecting by a user, via manipulating a user input device, from the entire displayed photograph image the predetermined area as the area for said test print.

24. The method according to claim 23, wherein the user selects the area by moving a cursor over area to set as the predetermined area.

25. A method of producing a print comprising:

pre-scanning image data representing a photograph image;

selecting a portion of the pre-scanned image data;

selecting a plurality of image processing parameters by providing a range for each of the plurality of image processing parameters;

generating a plurality of values for each of the plurality of image processing parameters;

generating a plurality of digital images, each having the selected portion to which one of the plurality of values for each of the plurality of image processing parameters is applied, each of the plurality of digital images has at least one value different from other images from the plurality of digital images;

printing a test print comprising the plurality of digital images.

26. The method according to claim 25, further comprising:

selecting values for each of the plurality of the parameters based on the test print;

storing the selected values in a memory;

executing a second pre-scanning of the image data representing a photograph image;

retrieving from the memory and applying to the image data, that was pre-scanned for a second time, the selected values; and printing entire image data that was pre-scanned for a second time.

27. The method according to claim 25, wherein the selected portion of the pre-scanned image data is identical in size during the test print and the printing of the entire image data.

28. The method according to claim 25, wherein a user selects the portion of the pre-scanned image data for the test print by selecting the portion from an entire image displayed on a display.

29. The method according to claim 25, wherein a range of values for each of the parameters is generated, and the values are combined to create various combinations, each combination having a value for each of the parameters, and wherein a combination from said various combination is applied to the selected portion of the pre-scanned image data to generate the digital image.

30. The method according to claim 25, wherein the selecting of the portion of the pre-scanned image data comprises designating by a user the portion of the pre-scanned image data using at least one of a keyboard and a mouse.

* * * * *